United States Patent Office 2,693,260
Patented Nov. 2, 1954

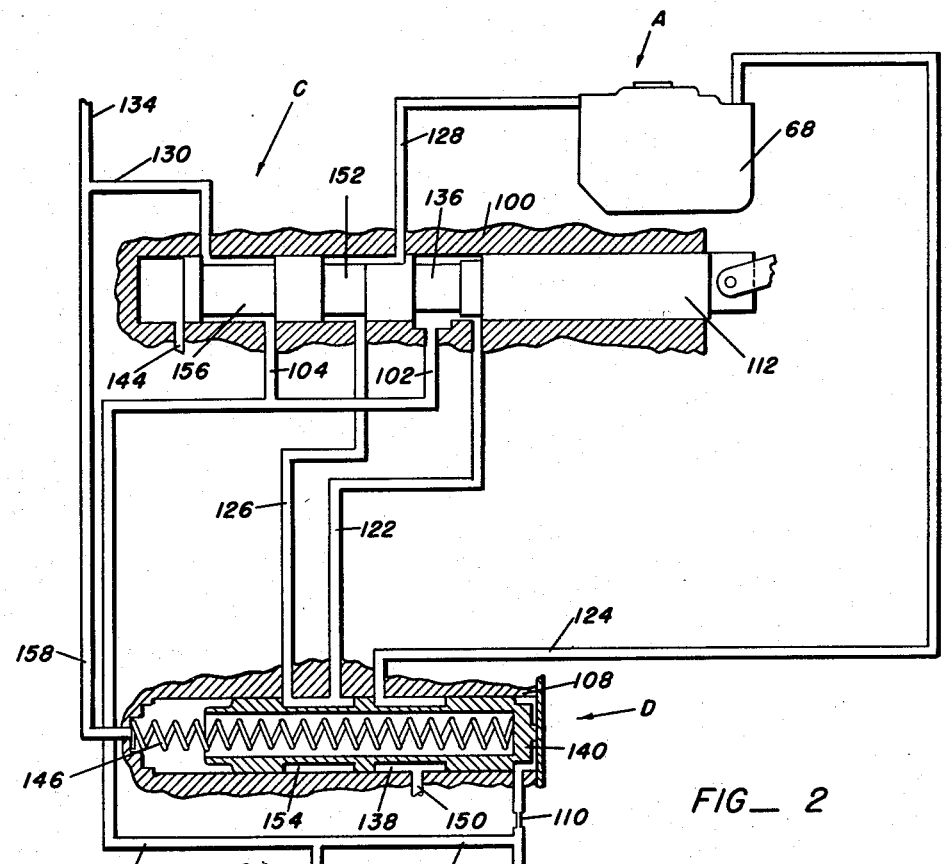
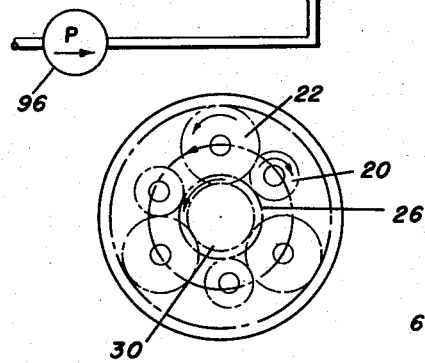
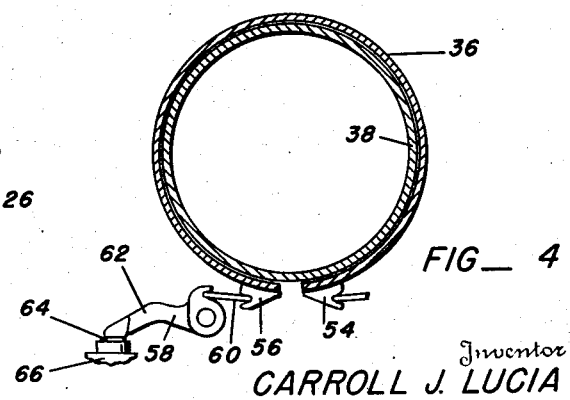

2,693,260

CLUTCH AND BRAKE FOR TRANSMISSIONS

Carroll J. Lucia, Birmingham, Mich., assignor to Packard Motor Car Company, Detroit, Mich., a corporation of Michigan Application March 7, 1950, Serial No. 148,022

20 Claims. (Cl. 192—17)

This invention relates to transmissions, and more particularly to transmissions including a planetary gearing wherein selectively operable brake and clutch means are employed to provide a torque changing or a direct drive, automatically operable means being used to control the relative engagement and disengagement of the brake and clutch members to effect a smooth shift of power from direct to geared drive, and vice versa, from a driving shaft to a driven shaft under all operating conditions.

The invention is illustrated as applied to a transmission of the type disclosed in application Serial No. 71,128, filed January 15, 1949, by Forest R. McFarland, wherein a driving sun gear operably connected to planetary pinion gears and a ring gear, together with a controlling sun gear, controls the speed and torque ratios of the drive through the gear train. The controlled sun gear may be locked against rotation by a brake to provide a speed reducing torque increasing drive, and may be clutched to the driving sun gear to provide a 1 to 1 or direct drive.

It will of course be understood that my invention is not limited to the particular type of planetary gear train disclosed, but is applicable to any such gear train wherein an element such as a sun gear, a planet carrier, or a ring gear is selectively braked or clutched to a driving member to provide different speed and torque ratio drives.

Assume for example that the gear train is such that when operating in low range with the controlled sun gear locked against rotation by the brake, a speed reduction of 1.8 to 1 is provided, that is the driving shaft will rotate 1.8 times while the driven shaft rotates once. When the controlled sun gear is clutched to the driving shaft a 1 to 1 ratio drive is of course provided.

It is apparent that to shift from geared speed to direct drive the speed of the engine or driving shaft must decrease from a ratio of 1.8 to 1. If the drive is transferred to the clutch providing the 1 to 1 drive before the driving shaft speed is reduced to approximately the speed of the driven shaft, undesirable operations are encountered. To overcome these difficulties it is desirable to engage the high range clutch before the low range brake is wholly released, both the clutch and brake being substantially engaged for an interval of time to reduce the speed of the driving shaft to approximately that of the driven shaft. When the speed of the driving shaft has thus decreased the brake is entirely released whereupon the drive is entirely through the clutch at a 1 to 1 ratio.

When making a shift from high range to low range, that is in the example under consideration, the controlled sun gear is released from the driving shaft and is locked against rotation by the brake, and it is necessary, in order to prevent lurching of the vehicle, to increase the speed of rotation of the driving shaft or engine. To accomplish this it is desirable to release the high range clutch whereupon the engine or driving shaft being relieved of its load will speed up. When the speed of the driving shaft has thus increased to the approximate speed of the driven shaft, the low range brake is fully engaged whereupon the flow of power is reestablished thereby effecting a smooth transition from high range to low range.

This invention is directed to the provision of a timing valve interposed in a hydraulic mechanism which controls the engagement and disengagement of the brake and clutch members, to control the time of engagement and release of the brake and clutch members as stated above to provide a smooth transition of power when shifting from one range to another.

In making a shift from low to high or direct the simultaneous engagement of the clutch and brake to reduce the speed of the engine or driving shaft is referred to as "overlap." In making a shift from high to low the release of the clutch to permit the speed of the engine or driving shaft to increase before engagement of the brake is referred to as "gap."

An object of this invention is therefore to provide a form of timing valve capable of effecting desired degrees of overlap or gap to provide smooth transition of power when shifting from low to high or vice versa.

A further object of the invention is to provide a construction wherein the amount of overlap and gap can be adjusted independently of each other.

Another object is to provide a control for brake and clutch members wherein various degrees of compensation of overlap and gap can be had for different degrees of relative speeds.

A still further object is to provide an automatic timing control for varying the overlap and gap conditions of clutch and brake members employed to provide varying speed ratios of drive in a planetary gear train.

Other objects and advantages of this invention will be apparent from the following detailed description, considered in connection with the accompanying drawings, wherein similar reference characters designate similar parts throughout the several views, and wherein:

Fig. 2 is a fragmentary diagrammatic view similar to a portion of Fig. 1 showing the control mechanism in a different position;

Fig. 3 is a diagrammatic cross section of the planetary gearing shown in Fig. 1; and Fig. 4 is a view of the brake mechanism.

Figure 1:
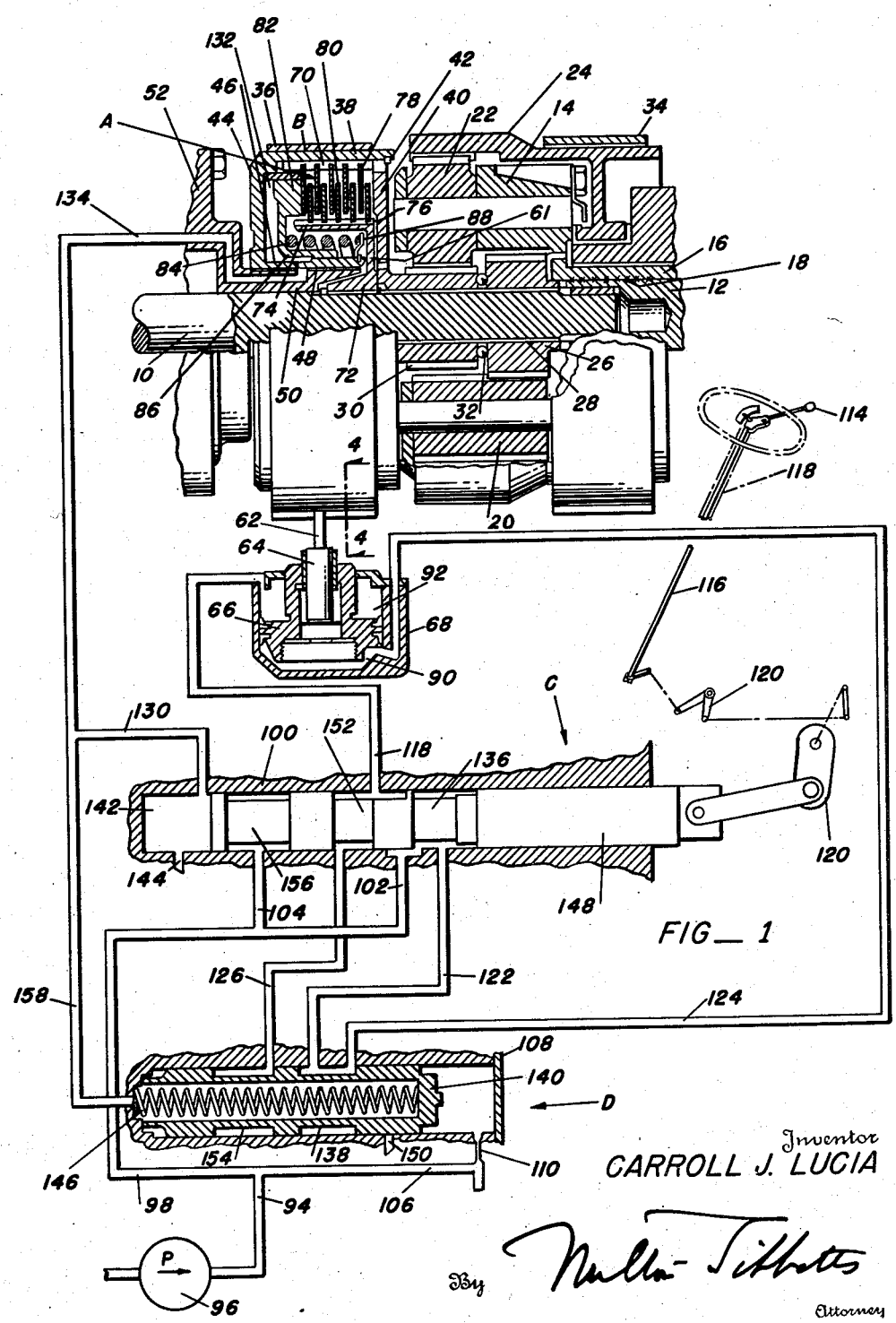
Fig. 1 is a somewhat diagrammatic view, partly in section and partly in elevation, of a transmission embodying my invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to Fig. 1, in the form of the invention illustrated herein, an engine shaft or driving shaft is shown at 10 and a driven shaft 12 is shown aligned therewith. These shafts may be connected either through a planetary gearing for a geared drive or through a clutch for direct drive. In the planetary gear train there is a carrier 14 which has a hub 16 secured to the driven shaft 12 as by brazing or welding and indicated at 18. A series of equally spaced long pinion gears 20 are rotatably mounted in the carrier 14 and meshing with these long pinion gears 20 are pinions 22 which latter also mesh with a ring gear 24. There is a driving sun gear 26 secured to turn with the driving shaft 10 as by splines 28 and this sun gear also meshes with the long pinion gears 20. A controlling sun gear 30 of smaller diameter than the driving sun gear 26 is mounted for rotation on the driving shaft 10 and is in mesh with the pinion gears 22. A thrust ball bearing 32 is preferably arranged between the sun gears 26 and 30.

It will be understood that if the sun gears 26 and 30 are locked together there will be a direct drive at a 1 to 1 speed between the driving shaft 10 and the driven shaft 12. Also, if the smaller sun gear 30 is braked against rotation and the direct drive connection is released, there will be a geared drive through the planetary gearing from the driving shaft 10 to the driven shaft 12, the driven shaft being operated at a slower speed than the driving shaft thus obtaining an increase of torque. Also, if the ring gear 24 is restrained against rotation as by the brake 34 there will be a reverse gear drive through the planetary gearing from the driving shaft 10 to the driven shaft 12 and at a reduced speed.

The controlling sun gear 30 is locked against rotation by a brake B, the encircling band of which is indicated at 36. The band operates on a brake drum 38 which is splined to a radial flange 40 on the sun gear 30. A snap ring 42 retains the flange in its position within the drum 38. The brake drum 38 is also provided with a flange 44 and a hub 46 mounted on a bushing 48 positioned in an axially extending portion 50 of a stationary member 52.

One end of the brake band 36 is anchored as at 54 and the other end 56 is operated by a bell crank lever 58 and a connecting link 60, as shown particularly in Fig. 4.

The arm 62 of the bell crank lever 58 is actuated by a piston 64 within a larger piston 66 mounted in a cylinder 68. This mechanism may be termed the actuator or brake actuating mechanism and forms a part of the brake B above referred to.

The brake drum 38 is interiorly formed with splines 70, and a hub 72 splined to the driving shaft 10 has a flange 61 on which is a drum 74 having splines 76. A clutch A is formed between the brake drum 38 and the drum 74 by means of plates 78 engaging the splines 70 on the brake drum 38 and alternating plates 80 on the splines 76 of the drum 74. This clutch A may be engaged by a fluid pressure operated ring type piston 82 in a cylinder 64 against the action of a spring 84 mounted on a cylindrical portion 86 of the piston. When the pressure against the piston 82 is released the spring 84 will disengage the clutch, the spring 84 operating against an abutment 88 on the hub 46 of the brake drum 38.

From the above it will be seen that when the controlling sun gear 30 is locked against rotation by the brake B the driving shaft 10 and the driving sun gear 26 fixed thereto will drive the long pinion gears 20 meshing with the short pinion gears 22 to rotate them around the stationary controlling sun gear 30 to drive the carrier 14 and final driven shaft 12 in the same direction as the driving shaft 10 but at a reduced speed and at a corresponding increase in torque. The speed reduction and increase in torque are of course dependent upon the ratio of the diameter of the driving sun gear 26 to the controlling sun gear 30.

When the controlling sun gear 30 is clutched to the driving shaft 10 by the clutch A above referred to, the driving shaft 10 operates the driven shaft 12 in direct drive, that is, at a 1 to 1 speed ratio with no increase in torque.

Referring again to the brake actuating mechanism, it will be understood that the brake may be engaged by introducing fluid under pressure into the chamber 90 below the pistons 64 and 66 in the cylinder 68 and may be released by venting the chamber 90 and at the same time introducing fluid under pressure into the chamber 92 above the pistons 64 and 66.

The fluid pressure operating means for controlling the engagement and disengagement of the brake B and the clutch A for transition respectively from a geared speed to a direct drive and vice versa will now be described. For this purpose there is provided a control valve C and a timing valve D, and in Fig. 1 the valves are shown in the position in which the clutch A is disengaged and the brake B is engaged whereby the indirect or geared drive from the driving shaft 10 to the driven shaft 12 is attained. In Fig. 2 the control valve C and the timing valve D are in the position in which the clutch A is engaged and brake B disengaged so that there is a direct drive from the driving shaft 10 to the driven shaft 12.

A main pressure supply conduit is indicated at 94 and this is supplied with pressure from a pump 96 which may draw oil from a sump or otherwise as desired.

This source of fluid pressure may be a constant pressure source or it may be a source which varies in proportion to the speed of the driving or the driven shaft, or with the position of an accelerator pedal controlling an engine.

A branch conduit 98 leads to a cylinder 100 of the control valve C, a sub-branch 102 connecting to the cylinder 100 adjacent the right-hand end thereof as shown in Fig. 1 and a sub-branch 104 connecting to adjacent the left-hand end of said cylinder. A branch conduit 106 extends from conduit 94 to adjacent the right-hand end of cylinder 108 of timing valve D and at some point in this conduit 106, preferably adjacent the cylinder 108, there is a restricted passage indicated at 110 so that there must of necessity be a slow passage of fluid both into and out of the right-hand end of the cylinder 108.

A control valve 112 in the cylinder 100 is formed with several lands and reduced diameters between the lands for controlling the fluid passing through the valve. This control valve 112 may be moved by an operator as by the selector lever 114, a rod 116 on the steering column 118 and levers and links indicated at 120.

A conduit 122 interconnects the right-hand portion of the cylinder 100 of the control valve C with the cylinder 108 of the timing valve D. A conduit 124 extends from the cylinder 108 at a point therein spaced from the conduit 122 to the cylinder 68 at a point below the piston 66. A conduit 126 extends from the cylinder 108 at a point spaced from the conduit 122, to the cylinder 100 at a point between the conduits 102 and 104. A conduit 118 extends from the cylinder 100 to the cylinder 68 at a point above the piston 66, that is, the releasing side 92 of the cylinder 68. A conduit 130 extends from adjacent the left-hand end of the cylinder 100 of the control valve C to the cylinder 132 of the clutch A. This connection may include a portion of the conduit 134 above referred to.

In the position of the valve 112 of the control valve C as shown in Fig. 1, fluid under pressure from conduits 94, 98 and 102 will pass through the cylinder 100 around the reduced portion thereof 136 and thence through conduit 122 to the reduced portion 138 of the valve 140 and thence through conduit 124 to the chamber 90 below the piston 66 in the cylinder 68 of the brake actuating means. Thus the pistons 66 and 64 are moved upwardly and the brake band 36 is applied to hold the controlling sun gear 30 against rotation. At the same time, as shown in Fig. 1, the pressure in the chamber 132 behind the piston 82 is relieved through the conduits 134 and 130, the space 142 at the left-hand end of the cylinder 100, and the vent 144, and the spring 84 separates the clutch plates and thereby causes release of the clutch. Also it will be noted that pressure is exerted against the right-hand end of the valve 140 to retain that valve in the left-hand position against the action of spring 146.

Now referring to Fig. 2, it will be seen that the valve 112 of control valve C is in its left-hand position and the valve 140 of timing valve D is in its right-hand position. This means that the fluid pressure beneath the piston 66 is released or vented by reason of the reduced portion 138 of valve 140 connecting the conduit 124 with the vent 150. Also, fluid pressure is supplied above the piston 66 through the conduit 128, reduced portion 152 of valve 112, conduit 126, reduced portion 154 of valve 140, conduit 122, reduced portion 136 of valve 112, conduits 102, 98 and 94, and pump 96. This reversal of positions in the cylinder 68 acts to lower the pistons 64 and 66 and release the brake band 36 from the brake drum 38 and consequently release the controlling sun gear 30.

With the valves 112 and 140 in the positions shown in Fig. 2, the clutch A is in the clutching position, this by reason of pressure being introduced in the cylinder 132 behind the clutch piston 82. This pressure comes through conduits 134 and 130, reduced portion 156 of valve 112, conduits 104, 98 and 94, and pump 96, this pressure acting against the spring 84.

It will be understood that the control valve 112 is movable from one of its extreme positions to the other and in one position the brake B is actuated to hold the control pinion 28 against turning while the clutch A is disengaged, and in the other position the brake releases the control pinion 30 and the clutch is engaged. Since the engine or driving shaft is rotating faster than the driven shaft when the transmission is in its geared position, it is desirable that the engine speed be reduced to prevent racing of the engine as the shift is made to direct drive. Also, it is desirable when shifting from direct drive to geared drive that the speed of the engine or driving shaft be increased in order to make a smooth shift. These desired results are obtained by reason of the construction and arrangement of the timing valve D in synchronism with the position or shifting of the control valve C.

As previously stated, the valve 140 of the timing valve D is provided with a coil spring 146 which tends to move the valve 140 toward the right in Figs. 1 and 2. In Fig. 1 however the valve is in the left position by reason of the pressure from the pump 96 supplied through conduits 94 and 106 and restricted conduit 110 to the right-hand end of cylinder 108 against the head of the valve 140. Now when the valve 112 of the control valve C is shifted to the left as has been done in Fig. 2, the valve 140 of the timing valve D does not instantly move to the right as it is shown in Fig. 2. With the pressure from conduit 94 at the right-hand end of the piston of the timing valve D we now have substantially the same pressure at the left-hand end of the piston 140 by reason of the reduced portion 156 of valve 112 of the control valve C connecting the conduit 104 with conduits 130 and 158. With this equalization of the pressures at the ends of the valve 140 the spring 146 tends to move the valve 140 toward the right and this would instantly occur except for the fact that there is a restriction 110 in the connection of the conduit 106 to the cylinder 108 which delays the movement of the valve 140. This slow movement of the valve 140 delays the release of the brake B until the engine or driving shaft 10 has had an opportunity to slow down to substantially the same speed as that of the driven shaft 12. At the same time the clutch has become engaged in the manner previously described and for a relatively short space of time there is an overlap while both brake and clutch are substantially engaged. This pulls the engine down to the desired speed and the brake then fully releases and permits the clutch to take over the drive from the shaft 10 to the driven shaft 12.

Again, with the valve 140 of the timing valve D in its right-hand position as shown in Fig. 2, if the valve 112 of control valve C is shifted to the right as shown in Fig. 1, the pressure is released from the left-hand end of valve 140 through the conduits 158 and 130 and the vent 144. This immediately starts the valve 140 of the timing valve D moving toward the left, but by reason of the restriction 110 in the conduit 106 this movement will be slow. However, the clutch A is immediately released through the conduits 134 and 130 and the vent 144 which permits the driving shaft 10 to speed up momentarily, a gap thus occurring between the disengagement of the clutch A and the engagement of the brake B. Eventually however, the valve 140 of the timing valve D reaches its left-hand position as shown in Fig. 1, and the pressure is supplied through conduit 124 to the cylinder 68 below the pistons 64 and 66 and the brake is fully applied.

From the above it will be seen that by suitably calibrating the size of the restricted passage 110 and the strength of the spring 146 it is possible to control the timing of the gap between the release of the clutch A and the engagement of the brake B. To vary the overlap or timing of the release of the brake in an upshift, the size of the restricted passage 110 is varied or the strength of the spring 146 may be changed. Also to vary the gap or period after clutch release and before brake engagement, the valve 140 may be shortened or elongated. It is thus possible to select a desired overlap characteristic without necessarily changing the gap characteristic, and vice versa.

In the diagrammatic representations of the various conduits and valves it has been necessary to spread them out in the drawings. As a matter of fact, from the practical standpoint it is desirable that the valves C and D be arranged contiguous to each other and contiguous also to the clutch and brake pistons which they control. A better sensitivity of control is thereby attained.

If desired the brake B may be released by spring pressure exerted in the chamber 94 to urge the piston 90 to the brake disengaging position rather than fluid pressure as described.

Attention is directed to the fact that if desired, the restriction 110 may be placed in the conduit 158 instead of in the conduit 106 since substantially the same results would be achieved.

Although the invention has been illustrated as applied to a particular type of control mechanism for planetary gearing it will be apparent that it may be applied to any control mechanism for varying the overlap or gap conditions in shifting from one torque ratio to another in other types of transmission mechanism.

I claim:

1. A clutch and brake system comprising, a brake, fluid pressure means for applying said brake, a clutch, fluid pressure means for engaging said clutch, a control valve for the fluid pressure for both the brake and the clutch so arranged that in one position the brake is applied and the clutch released and in another position the brake is released and the clutch is engaged, and a timing valve synchronized with the control valve, said timing valve having means movable therein and being adapted to momentarily prohibit engagement of the brake as the clutch is released to provide a gap and to delay the disengagement of the brake as the clutch is engaged to provide an overlap.

2. A clutch and brake system comprising, a brake, fluid pressure means for applying said brake, a clutch, fluid pressure means for engaging said clutch, a control valve for the fluid pressure for both the brake and the clutch so arranged that in one position the brake is applied and the clutch released and in another position the brake is released and the clutch is engaged, and a timing valve synchronized with the control valve, said timing valve having means movable therein and being adapted to momentarily prohibit engagement of the brake as the clutch is released to provide a gap in shifting from clutch to brake engagement position and to delay the disengagement of the brake as the clutch is engaged to provide an overlap in shifting from brake disengagement to clutch engagement position.

3. A clutch and brake system comprising, a brake, fluid pressure means for applying said brake, a clutch, fluid pressure means for engaging said clutch, a control valve for the fluid pressure for both the brake and the clutch so arranged that in one position the brake is applied and the clutch released and in another position the brake is released and the clutch is engaged, and a two position timing valve cooperating with said control valve in the control of said brake and clutch, fluid connections partly through said control valve from said pressure means to the opposite ends of said timing valve, spring means tending to move said timing valve from one of its positions to another, and means for restricting the passage of pressure fluid to said timing valve at one end thereof.

4. A brake and clutch system comprising a controllable member, fluid pressure operated brake means to lock the controllable member against rotation, fluid pressure operated clutch means to rotate the controllable member, a source of fluid pressure, a control valve to selectively direct fluid from said source to engage the brake or the clutch, and a timing valve having a spring pressed plunger interposed between the control valve and the fluid pressure operated means for the brake, means to subject one end of the plunger to fluid pressure from said source, and means operated in sequence with movement of the control valve to the clutch engaging position to subject the other end of the plunger of the timing valve to clutch actuating fluid pressure to induce simultaneous engagement of the clutch and brake.

5. In a brake and clutch system, a source of fluid pressure, separate fluid pressure operated means controlling the brake and clutch, a valve to control the flow of fluid from said source to the fluid pressure operated means, a timing valve interposed between the control valve and the fluid pressure operated means controlling the brake and including a cylinder having a plunger slidably mounted therein, yielding means urging the plunger toward one end of the cylinder, means to subject one end of the cylinder to fluid pressure from said source to urge the plunger to move in opposition to said yielding means, means to subject the opposite end of the cylinder to fluid pressure from the clutch fluid pressure operated means, the timing valve being so constructed and connected that when the control valve is shifted to engage the clutch the engagement of the brake continues for a predetermined time.

6. In a brake and clutch system including a rotatable input member, a rotatable output member and a controllable member, brake means to lock the controllable member against rotation, means to clutch the controllable member to the rotatable input member, a source of fluid pressure, fluid pressure operated means to engage the brake and clutch means, a control valve between said source and the fluid pressure operated means for the brake and clutch to selectively direct fluid to engage the brake or the clutch, a timing valve for cooperating with the control valve and the fluid pressure operated means for the brake and clutch, said timing valve including a movable element that is adapted to be actuated at one time by fluid pressure from said source and from the fluid pressure operated means to engage the clutch to induce simultaneous engagement of the clutch and brake and said movable element being adapted to be actuated at another time by fluid pressure from said source alone to engage the brake after the supply of pressure fluid to the clutch has been discontinued and said clutch has been disengaged.

7. In a clutch and brake system, a controllable element, brake and clutch means to actuate said controllable element, a source of fluid pressure, separate fluid pressure-operated chambers to actuate the brake and clutch, a valve to control the flow of fluid from said source to said chambers to actuate the brake and clutch, a timing valve between the control valve and one of said separate fluid pressure operated chambers and including a cylinder having a plunger slidably mounted therein, yielding means urging the plunger toward one end of the cylinder, means to subject one end of the cylinder to fluid pressure from said source to urge the plunger to move in opposition to said yielding means, means to subject the opposite end of the cylinder to fluid pressure from one of said separate fluid pressure operated means, the timing valve being so constructed and connected that movement of its plunger to direct fluid under pressure to one of said separate fluid pressure operated chambers is dependent upon the attainment of a substantially predetermined pressure in the other of said chambers.

8. In a clutch and brake system, a source of fluid pressure, fluid pressure operated clutch means, fluid pressure operated brake means, means including a control valve for selectively engaging the brake means or the clutch means, and means comprising a timing valve associated with the control valve and having a spring pressed plunger subjected at one end to metered fluid pressure from said source and subjected at its other end to clutch engaging pressure to time the engagement and disengagement of the brake means in proportion to fluid pressure exerted in the clutch means to induce simultaneous engagement or disengagement of the brake and clutch.

9. In a system having a clutch and brake means therein, a source of fluid pressure, fluid pressure responsive means for actuating the clutch, fluid pressure responsive means for operating the brake, means including a valve for controlling said fluid responsive clutch means and said fluid responsive brake means to apply either one and to release the other, and means including a timing valve associated with the control valve and having a spring pressed plunger subjected at one end to a restricted flow of fluid from said source of fluid pressure and subjected at its other end at one time to the fluid pressure prevailing in said fluid responsive clutch engaging means to time the engagement of the clutch and disengagement of the brake means to produce an overlapping engagement, and said plunger at another time being subjected to said restricted flow from said source and said spring pressure to effect a release of the clutch before engagement of the brake.

10. A clutch and brake system comprising a controllable member, fluid pressure operated brake means to lock the controllable member against rotation, fluid pressure operated clutch means to rotate the controllable member, a source of fluid pressure, a control valve to selectively direct fluid from said source to engage the brake or clutch, and a timing valve having a spring pressed plunger for cooperating with the control valve and the fluid pressure operated means for the brake, means to subject one end of the plunger to fluid pressure from said source, means that become operative in sequence with movement of the control valve to the clutch engaging position to subject the other end of the plunger of the timing valve to clutch actuating fluid pressure to induce a momentary simultaneous engagement of the clutch and brake, and vent means for said clutch actuating fluid pressure means, said vent cooperating with said sequentially operative means and said timing valve to permit said clutch to become disengaged before the brake becomes engaged upon a movement of said control valve to brake engaging position.

11. In a clutch and brake system, a source of fluid pressure, fluid pressure operated clutch means, fluid pressure operated brake means, means including a control valve for selectively engaging the brake means or the clutch means, and means comprising a timing valve associated with the control valve and having a spring pressed plunger subjected at one time to a metered fluid pressure from said source on one end thereof and subjected at its other end to clutch engaging pressure to time the engagement of the clutch and disengagement of the brake means in proportion to fluid pressure exerted in the clutch means to induce a momentary simultaneous overlapping engagement of the brake and clutch, and at another time said one end being subjected to said metered fluid pressure to drive the plunger against the spring alone so that the clutch may be disengaged before the brake engages.

12. In a brake and clutch system including a rotatable input member, a rotatable output member and a controllable member, brake means to lock the controllable member against rotation, means to clutch the controllable member to the rotatable member, a source of fluid pressure, fluid pressure operated means to engage the brake and clutch means, a control valve between said source and the fluid pressure operated means for the brake and clutch to selectively direct fluid to engage the brake or the clutch, a timing valve for cooperating with the control valve and the fluid pressure operated means for the brake and clutch, said timing valve including a movable element that is adapted to be actuated by fluid pressure from said source and from the fluid pressure operated means to engage the clutch which element moves in one direction to induce a momentary period of overlapping engagement of the clutch and brake during one sequence of clutch and brake actuation and which element moves in another direction to provide a momentary gap between the disengagement of one of the clutch and brake means and the engagement of the other of said means during a reverse sequence of clutch and brake actuation whereby to synchronize the operation of the rotatable input and rotatable output members.

13. In a clutch and brake system, a source of fluid pressure, fluid pressure operated clutch means, fluid pressure operated brake means, means including a control valve for selectively engaging the brake means or the clutch means, and means comprising a timing valve associated with the control valve and having a spring pressed plunger subjected at one end to metered fluid pressure from said source and subjected at its other end to the fluid pressure prevailing in the clutch engaging means to time the engagement of the clutch and disengagement of the brake means in proportion to fluid pressure exerted in the clutch means to induce a momentary simultaneous overlapping engagement of the brake and clutch when said prevailing pressure is operative to engage the clutch and to time the disengagement of the clutch and engagement of the brake when said prevailing pressure is reduced below the pressure operative to engage the clutch to produce a gap between the time of disengagement of the clutch and engagement of the brake.

14. In a clutch and brake system, a source of fluid pressure, fluid pressure operated clutch means, fluid pressure operated brake means, means including a control valve for selectively engaging the brake means or the clutch means, means comprising a timing valve associated with the control valve and having a plunger, a spring acting against one end of the plunger and subjected at the other end to metered fluid pressure from said source and subjected at its spring pressure end to the fluid pressure prevailing in the clutch engaging means to time the engagement of the clutch and disengagement of the brake means in proportion to fluid pressure exerted in the clutch means to induce a momentary simultaneous overlapping engagement of the brake and clutch when said prevailing pressure is operative to engage the clutch and to time the disengagement of the clutch and engagement of the brake when said prevailing pressure is reduced below the pressure operative to engage the clutch to produce a gap between the time of disengagement of the clutch and engagement of the brake, the metered fluid pressure being calibrated against the strength of the spring to control the timing of the gap.

15. In a clutch and brake system, a source of fluid pressure, fluid pressure operated clutch means, fluid pressure operated brake means, means including a control valve for selectively engaging the brake means or the clutch means, means comprising a timing valve associated with the control valve and having a spring pressed plunger, a spring acting against one end of the plunger and subjected at the other end to metered fluid pressure from said source and subjected at its spring pressed end to the fluid pressure prevailing in the clutch engaging means to time the engagement of the clutch and disengagement of the brake means in proportion to fluid pressure exerted in the clutch means to induce a momentary simultaneous overlapping engagement of the brake and clutch when said prevailing pressure is operative to engage the clutch and to time the disengagement of the clutch and engagement of the brake when said prevailing pressure is reduced below the pressure operative to engage the clutch to produce a gap between the time of disengagement of the clutch and engagement of the brake, the strength of the spring being selected to control the time of overlap.

16. In a clutch and brake system, a source of fluid pressure, fluid pressure operated clutch means, fluid pressure operated brake means, means including a control valve for selectively engaging the brake means or the clutch means, means comprising a timing valve associated with the control valve and having a spring pressed plunger, a restricted flow means to meter fluid pressure from said source, said plunger being subjected at one end to said metered fluid pressure and subjected at its other end to the fluid pressure prevailing in the clutch engaging means to time the engagement of the clutch and disengagement of the brake means in proportion to fluid pressure exerted in the clutch means to induce a momentary simultaneous overlapping engagement of the brake and clutch when said prevailing pressure is operative to engage the clutch and to time the disengagement of the clutch and engagement of the brake when said prevailing pressure is reduced below the pressure operative to engage the clutch to produce a gap between the time of disengagement of the clutch and engagement of the brake, the restriction of said restricted flow means being selected to produce the desired time of overlap.

17. In a clutch and brake means system, a source of fluid pressure, fluid pressure operated means for said clutch means, fluid pressure operated means for said brake means, means including a control valve for selectively engaging said fluid pressure operated means, and means comprising a timing valve associated with the control valve and having a spring pressed plunger, means connected to said timing valve to subject one end of said plunger to metered fluid pressure from said source and other means connected to said timing valve to subject the other end of the plunger to the fluid pressure of one of said fluid pressure operated means to assist the spring pressure, said plunger being interposed between said control valve and another of said fluid pressure operated means, said timing valve being operative to time the energization of said one fluid pressure operated means and deenergization of said other fluid pressure operated means in proportion to fluid pressure exerted in the clutch means to induce a momentary simultaneous overlapping energization of both of said fluid pressure operated means, and being operative to delay the energization of said other fluid pressure operated means until after the said one fluid pressure operated means is deenergized to produce a gap between the deenergization of said one and the energization of said other.

18. In a clutch and brake system, a source of fluid pressure, fluid pressure operated means for said clutch, fluid pressure operated means for said brake, means including a control valve for selectively engaging either of the fluid pressure operated means, and means comprising a timing valve associated with the control valve and having a spring pressed plunger, means connected to said timing valve to subject one end of said plunger to metered fluid pressure from said source and other means connected to said timing valve to subject the other end of the plunger to clutch engaging pressure to assist the spring pressure, said plunger being interposed between said control valve and said fluid pressure operated means for said brake, said timing valve being operative to time the engagement of the clutch and disengagement of the brake means in proportion to fluid pressure exerted in the clutch means to induce a momentary simultaneous overlapping engagement of the brake and clutch when said fluid pressure operated means is energized to engage said clutch, and being operative to delay the energization of said fluid operated means for operating the brake until after the clutch is disengaged to produce a gap between the disengagement of the clutch and the engagement of the brake.

19. In a clutch and brake system, a source of fluid pressure, fluid pressure operated means for said clutch, fluid pressure operated means for said brake, means including a control valve, a movable element in said valve, a fluid vent means cooperating with said control valve, said movable element being selectively adapted to effect delivery of fluid to said fluid pressure operated means for said clutch in one position and in another position to effect delivery of fluid to said fluid pressure operated means for said brake while effecting the venting of said fluid pressure operated means for said clutch, and means including a timing valve associated with the control valve and having a spring pressed plunger, means connected to said timing valve to subject one end of said plunger to metered fluid pressure from said source and other means connected to said timing valve to subject the other end of the plunger to clutch engaging pressure to assist the spring pressure, said plunger being interposed between said control valve and said fluid pressure operated means for said brake, said timing valve being operative to time the engagement of the clutch and disengagement of the brake means in proportion to fluid pressure exerted in the clutch means to induce a momentary simultaneous overlapping engagement of the brake and clutch when said fluid pressure operated means is energized to engage said clutch, and being operative to delay the energization of said fluid operated means for operating the brake until after the fluid pressure operated means for the clutch is vented and the clutch is disengaged to produce a gap between the disengagement of the clutch and the engagement of the brake.

20. In a clutch and brake system, a source of fluid pressure, fluid pressure operated means for said clutch, fluid pressure operated means for said brake, means including a control valve, a movable element in said valve, a fluid vent means cooperating with said control valve, said movable element being selectively adapted to effect delivery of fluid to said fluid pressure operated means for said clutch in one position and in another position to effect delivery of fluid to said fluid pressure operated means for said brake while effecting the venting of said fluid pressure operated means for said clutch, and means including a cylindrical timing valve associated with the control valve and having a spring pressed plunger, said plunger having an undercut portion to form a spool shape, means connected to said timing valve to subject one end of said plunger to metered fluid pressure from said source and other means connected to said timing valve to subject the other end of the plunger to clutch engaging pressure to assist the spring pressure, the undercut spool portion of said plunger being interposed between said control valve and said fluid pressure operated means for said brake, ports in said cylindrical valve for cooperating with said spool shaped plunger, said spool shaped plunger moving relatively slowly against said metered pressure under the influence of the fluid at clutch engaging pressure with the spring assist to cut off said ports whereby said timing valve is operative to time the engagement of the clutch and disengagement of the brake means in proportion to fluid pressure exerted in the clutch means to induce a momentary simultaneous overlapping engagement of the brake and clutch when said fluid pressure operated means is energized to engage said clutch, said spool shaped plunger moving relatively slowly against said spring pressure under the influence of said metered pressure to uncover said ports when said fluid operated clutch engaging means is vented whereby said timing valve is operative to delay the energization of said fluid operated means for operating the brake until after the fluid pressure operated means for the clutch is vented and the clutch is disengaged to produce a gap between the disengagement of the clutch and the engagement of the brake.

References Cited in the file of this patent

UNITED STATES PATENTS

| Number | Country | Date |
| --- | --- | --- |
| 1,473,115 | Mason | Nov. 6, 1923 |
| 1,566,111 | Miller | Dec. 15, 1925 |
| 2,050,520 | Carter | Aug. 11, 1936 |
| 2,068,357 | Stevens | Jan. 19, 1937 |
| 2,193,305 | Thompson | Mar. 12, 1940 |
| 2,195,783 | Ravigneaux | Apr. 2, 1940 |
| 2,204,872 | Thompson | June 18, 1940 |
| 2,220,517 | Friedmann | Nov. 5, 1940 |
| 2,279,597 | Selmer | Apr. 14, 1942 |
| 2,282,949 | Dolza | May 12, 1942 |
| 2,506,842 | Rockwell | May 9, 1950 |